United States Patent [19]

Behr

[11] 4,170,408
[45] Oct. 9, 1979

[54] MICROFILM VIEWER

[75] Inventor: Karl-Günther Behr, Biebertal, Fed. Rep. of Germany

[73] Assignee: Minox GmbH, Lahn-Gieben, Fed. Rep. of Germany

[21] Appl. No.: 895,966

[22] Filed: Apr. 13, 1978

[30] Foreign Application Priority Data

Aug. 18, 1977 [DE] Fed. Rep. of Germany ....... 2737254

[51] Int. Cl.² ............................................. G03B 21/30
[52] U.S. Cl. ......................................... 353/72; 353/79
[58] Field of Search ....................... 353/79, 72, 73, 17, 353/18, 119, 78, 26 R, 26 A, 97, 75; 352/104, 242, 243, 36, 34

[56] References Cited

U.S. PATENT DOCUMENTS

| 2,322,023 | 6/1943 | Hopkins | 353/72 X |
| 3,618,717 | 11/1971 | Anderson | 188/166 |
| 3,704,054 | 11/1972 | Robak | 353/75 X |
| 3,811,763 | 5/1974 | Cordonnier | 353/77 |
| 3,899,246 | 8/1975 | Edelstein | 353/72 X |
| 4,022,526 | 5/1977 | Badalich | 353/119 X |

FOREIGN PATENT DOCUMENTS 536005 3/1955 Belgium ..................................... 353/79
1102999 5/1955 France .

*Primary Examiner*—Harry N. Haroian
*Attorney, Agent, or Firm*—Hane, Roberts, Spiecens & Cohen

[57] ABSTRACT

A collapsible viewing device for viewing microfilm consists of a carrying case with a bottom part to which is hinged a lid. The case includes a viewing screen, a supply of light, a lever assembly and a spring assembly which, upon opening of the lid, automatically activates the light, moves the screen into its reading position and releasably locks the screen in its viewing position. Closing of the lid against the action of the spring assembly returns the screen into the position in the bottom part of the case against the action of the spring assembly and disconnects the light.

12 Claims, 10 Drawing Figures

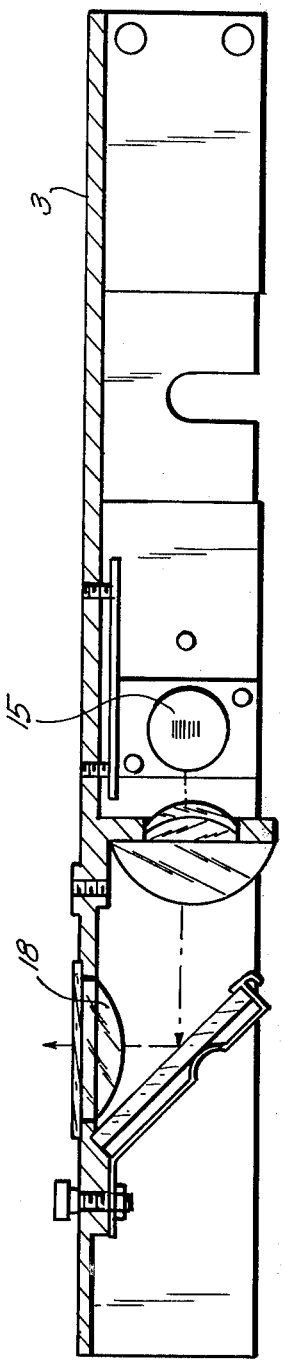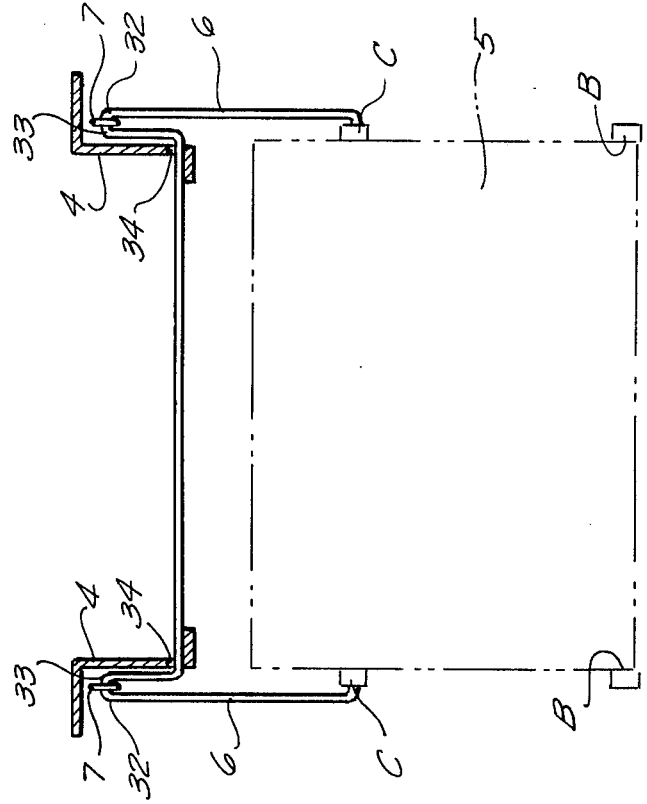

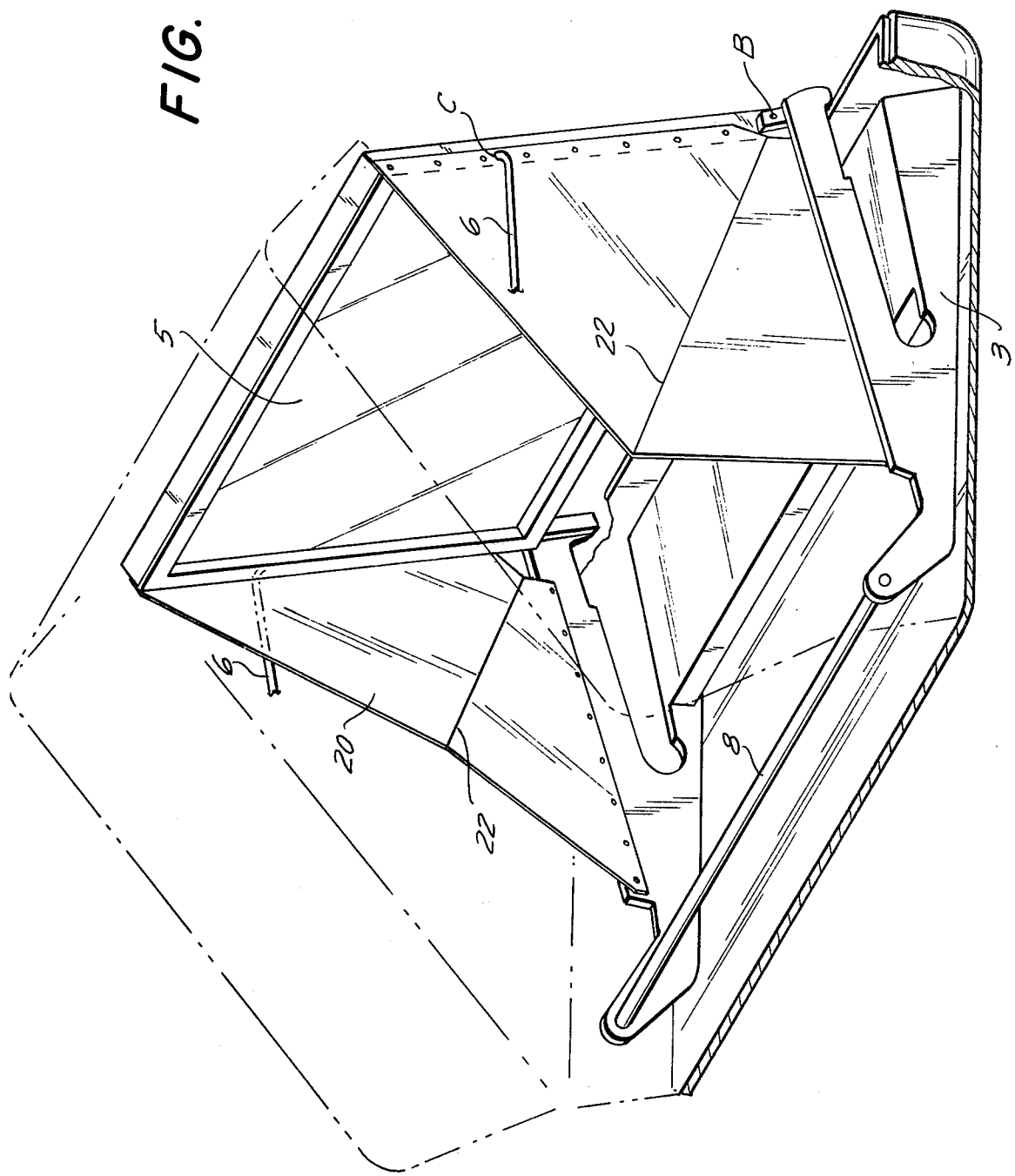

MICROFILM VIEWER

The invention relates to a microfilm viewer collapsible in a carrying case and more particularly to a viewer comprising a frame with an image gate, mirrors for deflecting light beams, and a viewing screen.

BACKGROUND OF THE INVENTION

Microfilm viewing devices of the general type above-referred to are known. However, the known viewers have the disadvantage that the handling of them is inconvenient and/or that their stability in use is insufficient. Microfilm viewers of this type are disclosed in German published application No. 2,064,672 published on July 22, 1971.

THE INVENTION

A broad object of the present invention is to provide a novel and improved device of the aforementioned type which can be opened by practically a single movement of the hand and which is immediately ready for operation and the stability of which in its operating position is very reliable. Such stability is highly important since in an opened position even a slight displacement of the optical axis can have the result that the image becomes illegible.

SUMMARY OF THE INVENTION

The afore-mentioned object and other objects, features and advantages of the invention are obtained by providing that the frame is fastened at a bottom of the case, that the viewing screen is pivotally supported on the front end of the frame and that the lid of the case which is hinged to the bottom of the case, mounts a pivot support on which is supported a pivotal lever at one end and the other end of which is pivotally connected to the viewing screen. As a result, the lid and the bottom part of the case, the viewing screen, and the pivotal lever constitute a four-part linkage system which assures a high degree of stability.

As a further feature of the invention, the pivotal lever is extended beyond its end which is connected to the lid of the case and connects at this end with one end of a tension spring, the other end of which is fastened on the lid of the case. As a result, the overcoming of the dead point position of the four-part linkage system, which must be effected upon opening of the case, is facilitated.

According to another feature of the invention, the pivot support at the lid of the case is shaped as a slot guide. As a result and in coaction with the tension spring the lid of the case will snap open to a small extent due to the action of the tension spring upon release of the locks of the case.

According to a still other feature of the invention, the frame for the viewing screen has at its free upper edge mating elements for the closure means on the lid of the case, In this manner it is possible to increase the stability further by forming a three-sided prism in the open condition of the viewer by the two parts forming the case and the viewing screen which is now firmly locked to them.

Other advantageous features of the invention will become evident from the claims.

BRIEF DESCRIPTION OF THE INVENTION

The invention will be explained in further detail by way of example with reference to the drawings, in which:

FIG. 6 is a horizontal cross-section along line VI—VI of FIG. 3 showing one embodiment of the linkage lever;

FIG. 9 is a fragmentary isometric view of the bellows portion of the invention partly folded or unfolded; and FIG. 10 is a fragmentary vertical section taken along line X—X of FIG. 8 showing the lamp system.

DETAILED DESCRIPTION

Figure 1:
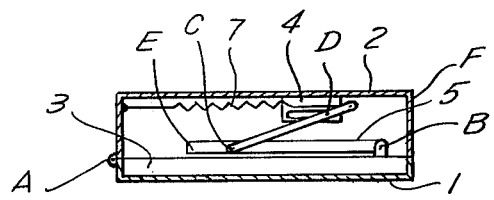
FIGS. 1 to 5 show schematically side views of the linkage system of a microfilm viewing device in accordance with the invention.

The basic manner of operation of the structure of a microfilm viewer in accordance with the invention will be first explained by means of the schematic structures of FIGS. 1 to 5. These figures show diagrammatically the bottom part 1 and the lid 2 of a carrying case. On the bottom 1 of the case a frame 3 is fastened as a base frame for the viewing device. On the lid 2 there is provided a pivot support 4 which has a slot guide as shown in the example.

The bottom and the lid of the case are pivotal relative to each other about point A. A viewing screen 5 is pivoted and mounted at the front end of the frame 3 by a pivot means B. The viewing screen 5 is supported at about its upper third part with a pivot pin C at one end of one pivotal lever 6 of a pair of such levers. The other end of the levers 6 is supported at the point D by pivot support 4.

The free edge of the viewing screen 5 is designated E. The free opening edge of the lid of the case is designated F.

Figure 2:
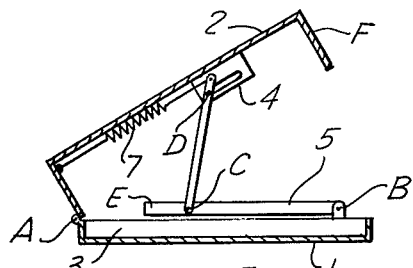

FIG. 1 shows the afore-referred to parts in the closed condition of the case. In this position, the lever 6 is forced via a tension spring 7 against the inner end of the lid of the case. When the lock (not shown) of the case is opened, the tension spring 7 pulls the lever as the pivot point D of the lever can slide within the pivot support 4. Thus the position shown in FIG. 2 is reached in which the lid 2 of the case is swung up a small distance about the pivot pin A.

Figure 3:
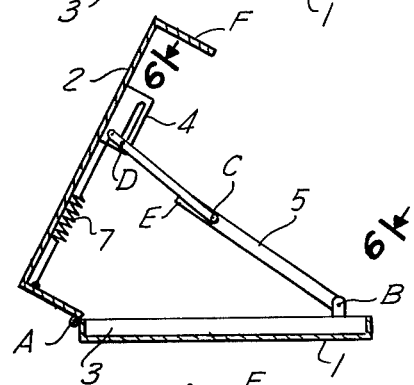

When the lid 2 of the case is now opened further, the position shown in FIG. 3 is obtained, the parts being shown just before the dead point of the pivot axis C. As can now be seen, the tension spring 7 continues to act upon lever 6 so that the dead point is automatically passed. Upon lifting from the position shown in FIG. 2 into the position shown in FIG. 3, the lever 6 carries the viewing screen 5 along with it, that is, the screen is swung upwardly about the pivot B.

Figure 4:
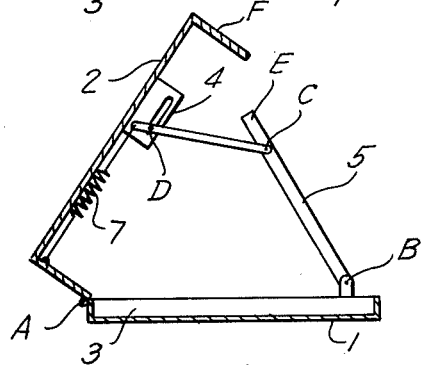

Upon passing the dead point position of the pivot C between the viewing screen 5 and the lever 6, the lid 2 of the case is moved further in the direction of closing. As a result, the parts of the viewing device as shown in FIG. 4 are moved into the position shown in FIG. 5. In this position the free edge E of the viewing screen is locked together with the front edge F of the lid 2 of the case.

Figure 5:
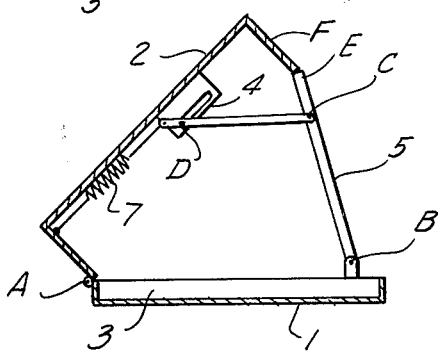

As it is now apparent, the four-part linkage system A, B, C, and D, upon opening of the lid of the case automatically causes movements of the parts involved by which the highest possible relative stability of the parts with respect to each other is obtained. In the locked open position as shown in FIG. 5, a triangle of parts is formed which in this condition also assures the highest possible strength.

The closing of the viewing device is effected by reversing the afore-referred to movements. However, it may be necessary or at least advisable to press the frame for the viewing screen 5 down by hand past the dead point of the pivot C. In order to move the case out of the position shown in FIG. 2 into the closed position, the lid of the case must also be pressed down slightly to overcome the counter action of the spring 7.

A specific embodiment of the invention will now be described in detail with reference to FIGS. 7 and 8 in which the same reference numbers have been used as in FIGS. 1 to 5 for the same parts.

The frame 3 is connected to the bottom 1 of the case by means of hinges with a pivot pin 8. The frame 3 has attached thereto a magnet 9 which, in coaction with a ferrous plate 10 such as a steel plate fastened on the bottom of the case, constitutes a lock or retention which holds the frame in its position in the bottom part of the case.

The frame supports guide elements 11,12 which support the image gate 13. This gate is movable via guides 11,12 in two coordinated directions across the entire length and width of the microfilm. By means of an operating lever 14, the viewing screen can easily be brought into the desired position when the viewing device is opened. The frame 3 furthermore supports on its bottom a lamp 15 and a cooling fan 16. On its front edge the frame 3 supports a lens guide 17 in which an interchangeable lens 18 is fitted.

The front end of the frame 3 supports a first deflection mirror 19 above the lens 18. The viewing screen 5 is connected at the front end of the frame 3 via hinges including the pivot pin 8. Between the frame 3 and the rim of the viewing screen 5 there is arranged, on both sides of the case, a folded bellows 20 the upper edge of which is designated 21 in FIG. 8 and which has a fold 22. This fold in the collapsed condition of the device is located below the viewing screen 5. The bellows is so dimensioned that it extends beyond the lower edge 23 of the lid 2 of the case and thus prevents the intrusion of outside light when the viewing device is in its operating position.

In the lower part of the lid of the case, there is arranged a second deflecting mirror 24 which is fastened rigidly to an intermediate wall 40. Between this intermediate wall and the lower part of the lid 2 of the case, there is thus formed a space 25 in which the connecting parts and the high voltage part of the viewing device are arranged. These parts comprise a main switch 26, a net or line terminal 27, a low voltage terminal 28 and a transformer 29.

In this manner the line-voltage parts are arranged in a closed space so that when the frame 3 is lifted out of the bottom part 1 of the case only parts which are carrying low voltage are accessible. In addition, a switch 30 assures that when the carrying case is closed, feed of current to the device is automatically interrupted. As a result, it is assured that if the case is closed while still connected to an outlet socket or some other source of current, the supply of current is interrupted so that the lamp 15 does not continue to burn or the fan 16 continue to operate or the transformer 29 continue to be further supplied with current.

Figure 7:
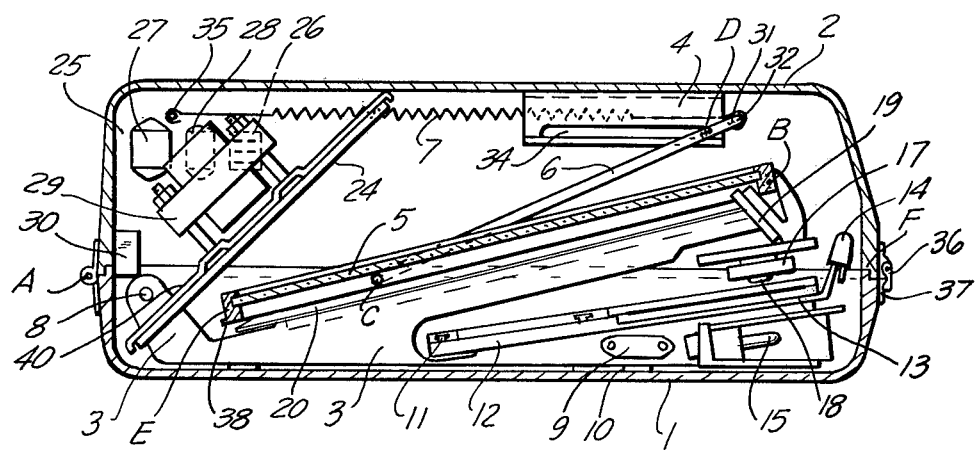
FIG. 7 is a vertical cross-section along line VII—VII of FIG. 8 of a viewing device in accordance with the invention, shown closed.
Figure 8:
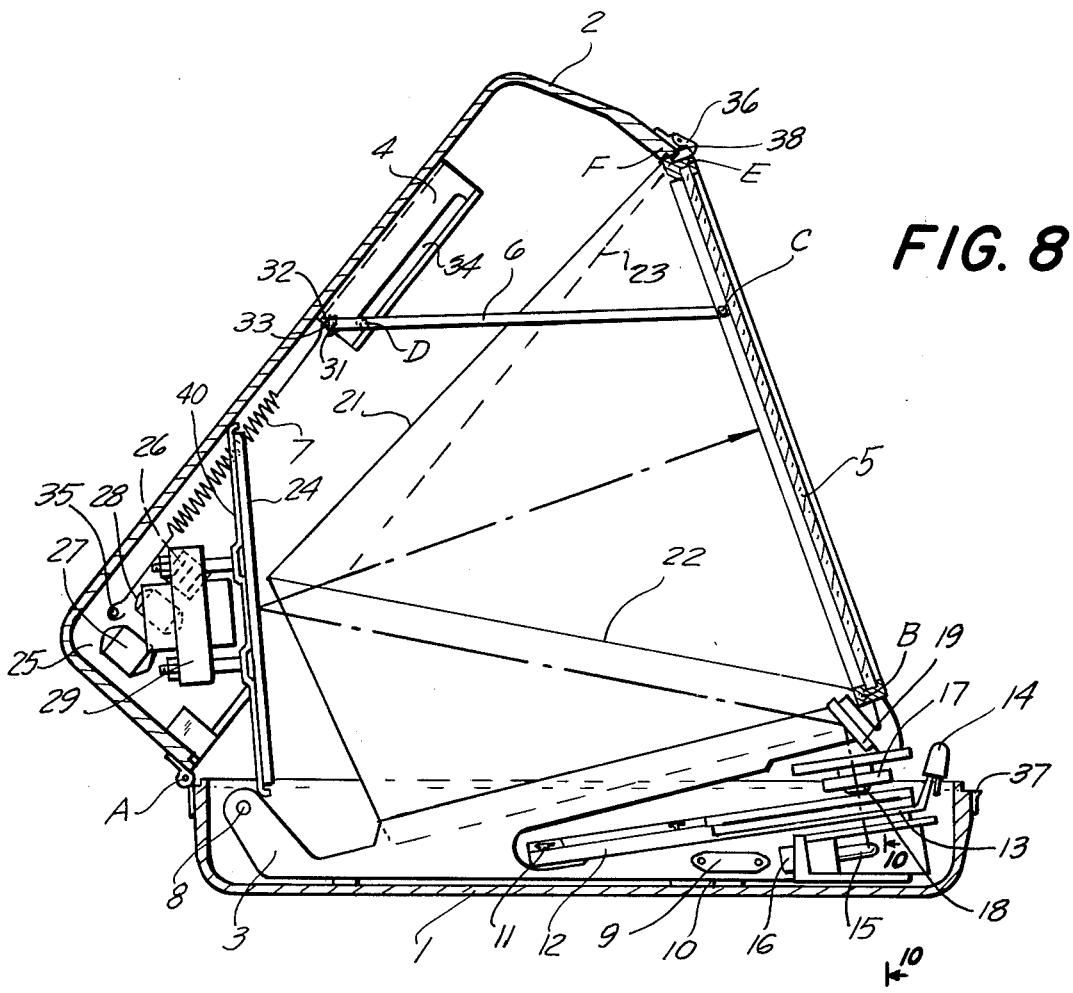
FIG. 8 is a vertical sectional view along line VIII—VIII of FIG. 7 of a viewing device in accordance with the invention shown in open and locked condition.

FIG. 6 is a horizontal section of the pivotal lever 6, as can be used in the embodiment of FIGS. 7 or 8.

Lever 6 which is connected by the pivotal system C on the frame of the viewing screen 5 is shown to be made of rigid wire or a bar bent substantially into U-shaped. The web arm 31 constitutes the pivot axle which engages the pivot supports 4. The pivotal lever is extended beyond the pin 31 by crank-shaped bends 32. The top 33 of the bands engages one end of the spring 7. This arm 31 slides in a slot guide 34 in the pivot support 4 and the other end of the spring 7 is fastened at 35 to the lower part of the lid 2 of the carrying case.

The lid 2 of the case bears locking elements 36 which cooperate with locking elements 37 on the bottom of the case and with locking elements 38 on the frame of the viewing screen 5.

In FIG. 9 is seen the viewing screen 5 being raised or lowered by folding bellows 20 mounted on Frame 3.

FIG. 10 illustrates how light from lamp 15 is projected through a condenser and mirror through lens 18; all mounted on Frame 3.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A collapsible viewing device for viewing microfilm comprising: a carrying case having a bottom part and a lid, a first hinge pivotably connecting said bottom part and said lid for opening and closing the case; a frame defining an image gate, said frame being fastened to the bottom part of the case; a viewing screen, a second hinge pivotally connecting said viewing screen to the frame; a source of electric light mounted within the case; mirrors for deflecting light beams generated by said source of light upon the viewing screen; a pivotal support means fastened to the lid of the case; a lever pivotally attached at one end to said support means, and a third hinge pivotally connecting the other end of said lever to said viewing screen, said lid being pivotable about said first hinge with respect to said bottom part, upon opening of the case, to produce relative pivotable movement of said lever about said third hinge and relative pivotable movement of said viewing screen about said second hinge until said lid reaches an operative position in which said lid bears against said viewing screen at that end thereof remote from said second hinge to form a stable assembly constituted by said frame, said first and second hinges and said lid bearing on said viewing screen, said lever constituting a connecting linkage between said lid and said screen in said operative position.

2. The viewing device according to claim 1 wherein the end of said lever pivotally attached at one end to the lid is extended beyond said attached end, and further comprising a tension spring having one end attached to said extended end, the other end of said spring being fastened to said lid.

3. The viewing device according to claim 1 wherein said pivotal support means includes a slot guide for slidably guiding therein said one end of the pivotal lever.

4. The viewing device according to claim 1 wherein said pivotal lever comprises a yoke-shaped portion providing the pivot portion of the lever.

5. The viewing device according to claim 1 and comprising coacting locking members on the case and the lid, said locking members being secured to the lid and to said frame at the free upper edge thereof, respectively.

6. The viewing device according to claim 1 and comprising a bellows having edges secured to side edges of said viewing screen and other edges attached to said frame, the lid and a light-proof bottom plate of the frame constituting a light-proof shield for the upper and lower sides of the bellows.

7. The viewing device according to claim 1 comprising pivot means for the frame for swinging the frame upwardly and locking the frame to the bottom of the case.

8. The viewing device according to claim 7 comprising magnetic locking means for locking the frame to the bottom of the case.

9. The viewing device according to claim 1 wherein said image gate is attachable to the frame.

10. The viewing device according to claim 1 wherein said mirrors include a first deflecting mirror rigidly attached to the edge of the frame adjacent to the opening edge of the lid and a second deflecting mirror rigidly attached to the inside of the lid.

11. The viewing device according to claim 1 comprising electric power supply means inside said lid.

12. The viewing device according to claim 1 comprising a switch means for closing and opening an electric power supply for said lighting means, said switch means being disposed and arranged to be automatically opened upon closing of the lid.

* * * * *